(12) United States Patent
Sahawneh et al.

(10) Patent No.: US 11,353,657 B2
(45) Date of Patent: Jun. 7, 2022

(54) FIBER-OPTIC-SPLICE ENCLOSURE

(71) Applicant: Huntington Ingalls Industries, Inc., Newport News, VA (US)

(72) Inventors: Ibrahim Sahawneh, Newport News, VA (US); James Ragsdale, Newport News, VA (US); Jason P. Farmer, Newport News, VA (US)

(73) Assignee: Huntington Ingalls Industries, Inc., Newport News, VA (US)

( * ) Notice: Subject to any disclaimer, the term of this patent is extended or adjusted under 35 U.S.C. 154(b) by 0 days.

(21) Appl. No.: 17/068,580

(22) Filed: Oct. 12, 2020

(65) Prior Publication Data

US 2022/0113470 A1 Apr. 14, 2022

(51) Int. Cl.
*G02B 6/245* (2006.01)
*G02B 6/255* (2006.01)
*G02B 6/38* (2006.01)

(52) U.S. Cl.
CPC .......... *G02B 6/2558* (2013.01); *G02B 6/245* (2013.01); *G02B 6/3851* (2013.01)

(58) Field of Classification Search
CPC ..... G02B 6/245; G02B 6/2558; G02B 6/3851
See application file for complete search history.

(56) References Cited

U.S. PATENT DOCUMENTS

| | | | | |
|---|---|---|---|---|
| 5,224,189 A * | 6/1993 | Maas | ................... | G02B 6/2558 |
| | | | | 385/98 |
| 8,915,659 B2 * | 12/2014 | Marcouiller | ......... | G02B 6/4432 |
| | | | | 385/95 |
| 2020/0257055 A1 * | 8/2020 | Beach | .................. | G02B 6/3858 |

* cited by examiner

*Primary Examiner* — Ryan A Lepisto
(74) *Attorney, Agent, or Firm* — Shook, Hardy & Bacon, L.L.P.

(57) ABSTRACT

In various examples, a fiber-optic-splice enclosure may be suitable for use in various applications, environments, and use conditions. In at least some embodiments, the fiber-optic-splice enclosure includes an adjustable length, which may permit the fiber-optic-splice enclosure to be customized to fit various lengths of a spliced region. In a further aspect, the fiber-optic-splice enclosure may include a splice retainer to attenuate vibrational and other forces and reduce potential effects of those forces on the splice. Moreover, in some other aspects, the construction of the fiber-optic-splice enclosure may allow for relatively straightforward and efficient assembly. For example, a key and keyway configuration between different components of the fiber-optic-splice enclosure may permit the components to selectively slide relative to one another or be engaged to one another.

13 Claims, 12 Drawing Sheets

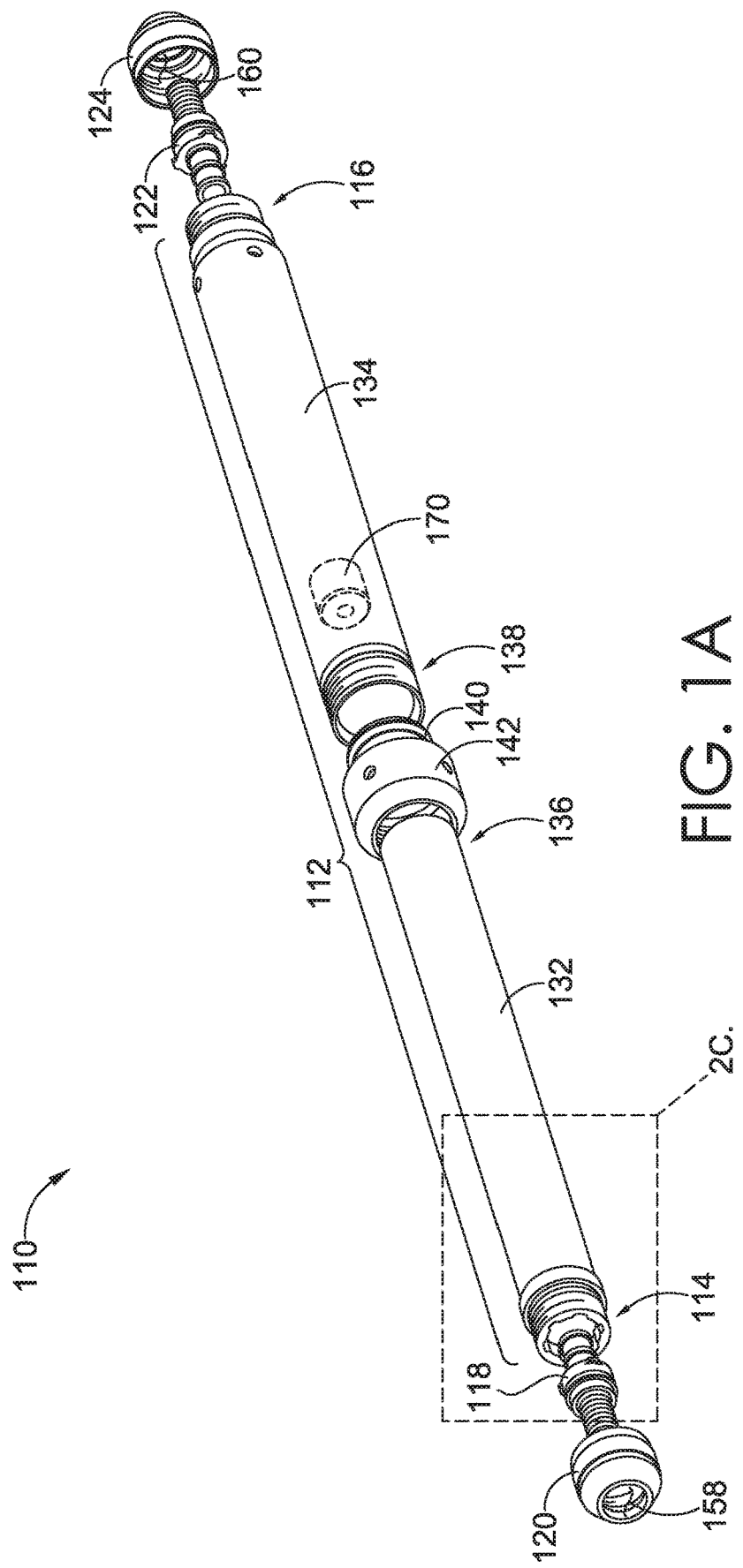

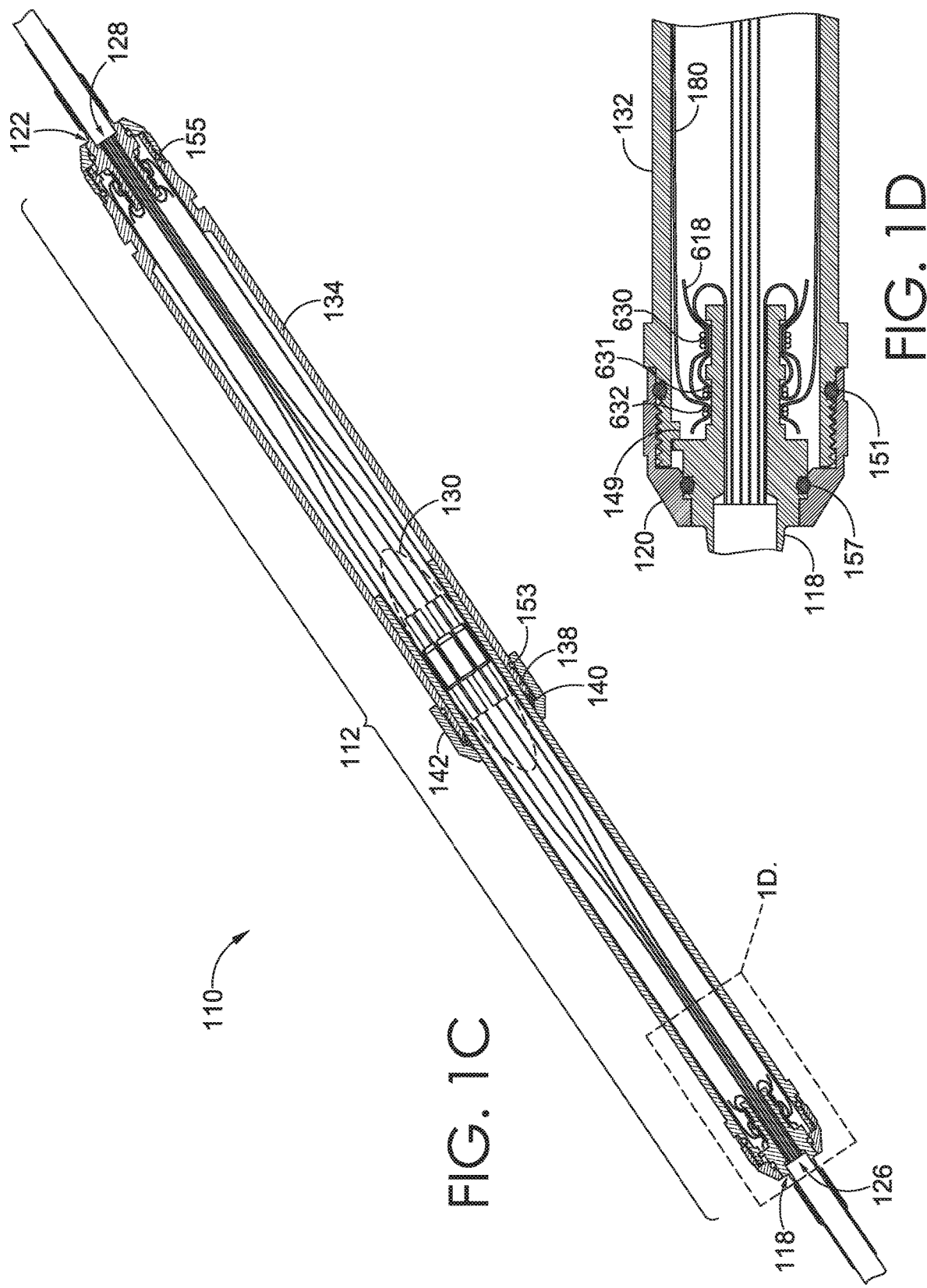

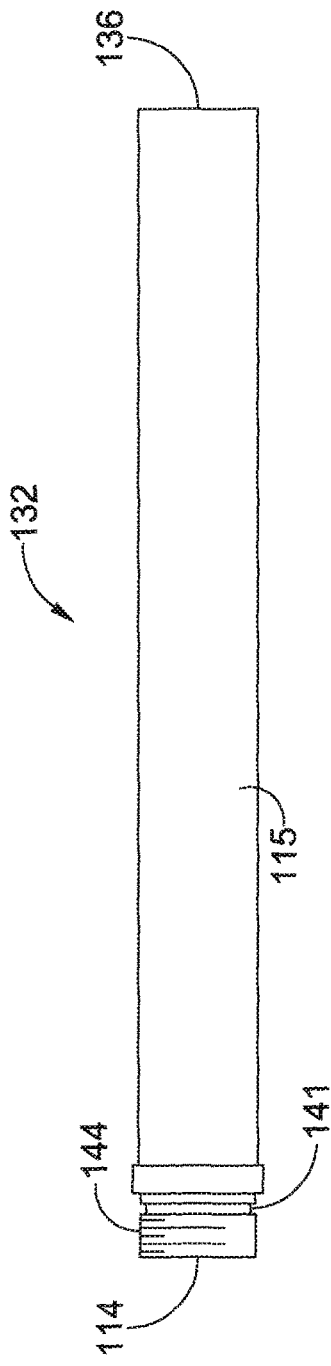
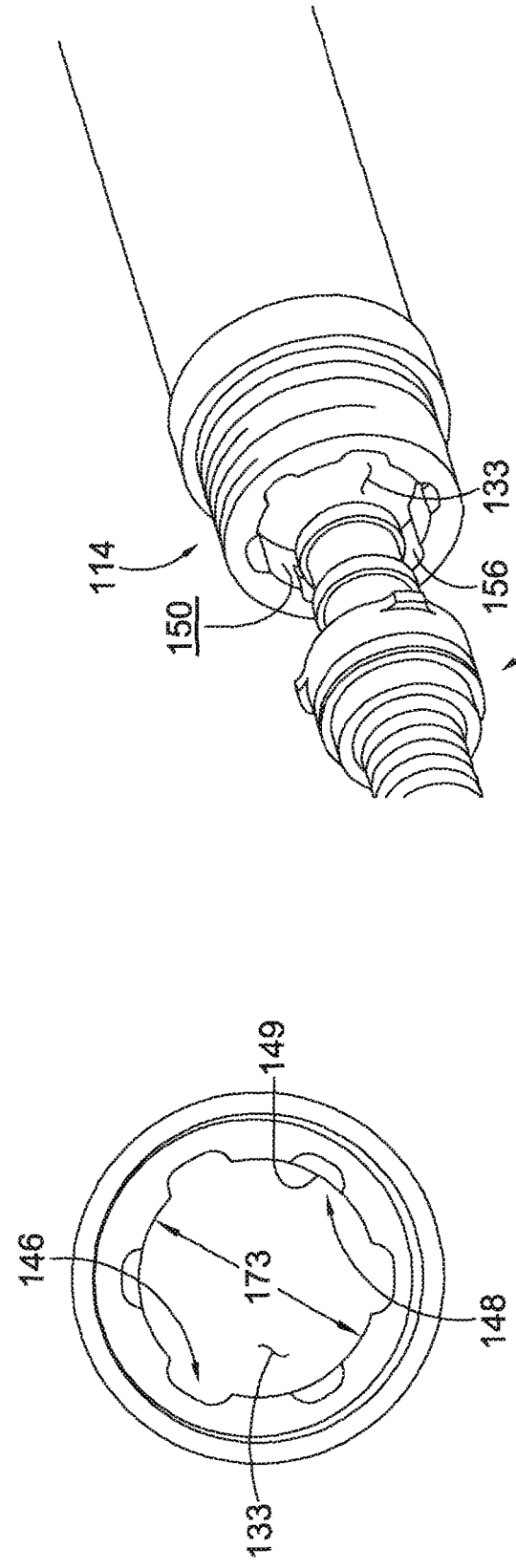

FIBER-OPTIC-SPLICE ENCLOSURE

BACKGROUND

Due to the relatively low cost and better optical performance of fusion splicing (e.g., performed using a core alignment fusion splicing machine), as compared to other methods, fusion splicing is often the choice method for joining and/or extending fiber optic cables. Fiber-optic cables may be spliced for various reasons. For example, two fiber-optic cables may be spliced when connecting two cables that comprise a completed circuit. In other instances, a fiber-optic cable may be damaged (e.g., accidentally broken) during installation, in which case the damaged fiber-optic cable may be restored by fusion splicing. Once fiber-optic cables have been spliced, it is often necessary to enclose the spliced region for environmental protection. However, existing splice enclosures may not be suitable for harsh environmental and/or use conditions (e.g., shipboard applications) and may not provide a desired amount of protection, such as from impact, pulling forces, torsional strain, and the like.

SUMMARY

Embodiments of the present disclosure relate to an inline fiber-optic-splice enclosure. The subject matter described herein encloses a fiber-optic splice and may protect the spliced region from damage or degradation arising from various conditions (e.g., axial strain, torsional strain, corrosive agents, impact, crush, vibration, temperature, etc.).

In contrast to conventional devices, the present fiber-optic-splice enclosure is suitable for use in shipboard applications and other relatively harsh environments and use conditions. In addition, in at least some embodiments, the fiber-optic-splice enclosure includes an adjustable length, which permits the fiber-optic-splice enclosure to be customized to fit to a length of a spliced region. In a further aspect, the fiber-optic-splice enclosure includes a splice retainer to attenuate vibrational and other forces and reduce potential effects of those forces on the splice. Moreover, in some aspects, the construction of the fiber-optic-splice enclosure allows for relatively straightforward assembly. For example, a key and keyway configuration between different components of the fiber-optic-splice enclosure may permit the components to selectively slide relative to one another or be engaged to one another.

BRIEF DESCRIPTION OF THE DRAWINGS

Additional aspects of the present disclosure directed to a fiber-optic-splice enclosure are described in detail below with reference to the attached drawing figures, which are incorporated herein by reference and are briefly described directly below.

FIG. 1A is an illustration of components of a fiber-optic-splice enclosure in an exploded view in accordance with an embodiment of the present disclosure.

FIG. 1C is an illustration of a cross-sectional view of the fiber-optic-splice enclosure of FIG. 1B, in accordance with an embodiment of the present disclosure.

FIG. 1D is an illustration of an enlarged part of the cross-sectional view in FIG. 1C, in accordance with an embodiment of the present disclosure.

FIG. 2A is an illustration of a first tubular barrel of the fiber-optic-splice enclosure in FIGS. 1A-1D, in accordance with an embodiment of the present disclosure.

FIG. 2B is an illustration of an end of the first tubular barrel in FIG. 2A (enlarged in FIG. 2B), showing a keyway, in accordance with an embodiment of the present disclosure.

FIG. 2C is an enlarged view of an end of the first tubular barrel, in combination with a ferrule, as shown in FIG. 1A, in accordance with an embodiment of the present disclosure.

DETAILED DESCRIPTION

Figure 1B:
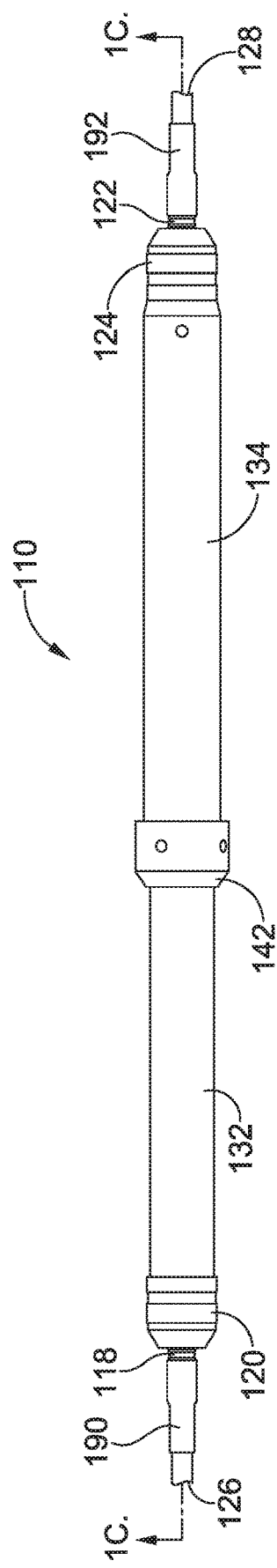
FIG. 1B is an illustration of the fiber-optic-splice enclosure assembled, in accordance with an embodiment of the present disclosure.

Subject matter related to a fiber-optic-splice enclosure is described throughout this Specification in detail and with specificity in order to meet statutory requirements. The aspects described throughout this Specification are intended to be illustrative rather than restrictive, and the description itself is not intended necessarily to limit the scope of the claims. Rather, the claimed subject matter might be practiced in other ways to include different elements or combinations of elements that are equivalent to the ones described in this Specification and that are in conjunction with other present technologies or future technologies. Upon reading the present disclosure, alternative aspects may become apparent to ordinary skilled artisans that practice in areas relevant to the described aspects, without departing from the scope of this disclosure. It will be understood that certain features and subcombinations are of utility and may be employed without reference to other features and subcombinations. This is contemplated by, and is within the scope of, the claims.

Articles and methods are disclosed related to a fiber-optic-splice enclosure, which protects a fiber-optic splice from potential damage or degradation arising from various conditions. That is, fiber-optic cables are sometimes spliced (e.g., fused) for various reasons. For example, two fiber-optic cables may be spliced when a connecting two cables that comprise a completed circuit. In other instances, a fiber-optic cable may be damaged (e.g., accidentally broken during installation), in which case the damaged fiber-optic cable may be restored by splicing. Once fiber-optic cables have been spliced, it may be desirable to enclose the splice for protection from various conditions. Examples of conditions that may damage or degrade the fiber-optic cable in the spliced region include external forces (e.g., pulling, pushing, twisting, vibrating, impact, etc.), as well as environmental conditions (e.g., moisture, chemical, thermal, etc.). Furthermore, some environments in which fiber-optic cables are used may experience or present harsher conditions (e.g., shipboard installation), which necessitate a fiber-optic enclosure providing enhanced protection.

The present disclosure describes a fiber-optic-splice enclosure that may protect a fiber-optic splice from various conditions and that may be straightforward to install and assemble (e.g., relative to some other types of enclosures or approaches to protecting a splice). Among other things, the fiber-optic-splice enclosure includes a tubular housing that connects to ferrules on opposing ends. In one aspect, the fiber-optic-splice enclosure may include components that interact with one another (e.g., relatively slide or retain in position) using a key and keyway structure or arrangement. For example, an end of the tubular housing may include a keyway corresponding to a key on a ferrule, which may permit the tubular housing to selectively either slide relative to the ferrule or lock in position, rendering assembly more efficient and straightforward. In another aspect, the tubular housing may be adjustable to customize a length of the fiber-optic-splice enclosure to match dimensions of the fiber-optic splice, which may allow for a more versatile enclosure that is adaptable splice regions of various splice lengths and/or sizes in the field. In yet a further aspect, the fiber-optic-splice enclosure may include a splice retainer that is positionable inside the tubular housing and that may protect spliced portions from vibration or other forces. These and other aspects will be described in more detail with respect to the various figures.

Referring to FIG. 1A, FIG. 1A illustrates an exploded view of a fiber-optic-splice enclosure 110 according to an aspect of the present disclosure. The enclosure 110 includes a tubular housing 112 having a first end 114 and a second end 116. In addition, the enclosure 110 includes a first ferrule 118 that is retained at the first end 114 by a first end cap 120 and a second ferrule 122 that is retained at the second end 116 by a second end cap 124. At a high level, each ferrule 118 and 122 attaches to a respective fiber-optic-cable portion to be spliced, and once spliced, the spliced region is contained within the tubular housing 112 after the enclosure 110 is assembled. For example, referring to FIGS. 1B and 1C, the enclosure 110 is illustrated in an assembled state, including each ferrule 118 and 122 being coupled to a respective cable portion 126 and 128, and the spliced region 130 being contained within the tubular housing 112. Examples of types of fiber-optic cables include those compliant with one or more of: MIL-PRF-85045/17-01P, MIL-PRF-85045/17-02P, MIL-PRF-85045/18-01P, or MIL-PRF-85045/18-02P. These cables may include various numbers of bundled fibers (e.g., four fibers or eight fibers) and may include various layers of protective encasements, including an outer jacket, taping, bundles/strands of protective yarns or other material, strengthening rods or members, and the like.

The enclosure 110 includes various elements that may contribute to the operation of the enclosure 110 to protect the spliced region 130. In one aspect the tubular housing 112 is an adjustable-length tubular housing including a first tubular barrel 132 and a second tubular barrel 134 that are telescopically adjustable with respect to one another. For example, a second end 136 of the first tubular barrel 132 (also referred to an inner tubular barrel 132) may be insertable into a second end 138 of the second tubular barrel 134 (also referred to as an outer tubular barrel) and may slide inward or outward to adjust an overall length of the tubular housing 112. Once a desired overall length for the tubular housing 112 has been reached by sliding the first and second tubular barrels 132 and 134 relative to one another, the relative positions of the first tubular barrel 132 and the second tubular barrel 134 may be set and compressively held in position by a combination of a compression ring 140 and a barrel compression cap 142, which threadably attaches to the second end 138 of the second tubular barrel 134.

Referring to FIGS. 2A, 2B, 2C, 3A, and 3B, additional details of the first tubular barrel 132 and the second tubular barrel 134 are illustrated. More specifically, FIG. 2A illustrates a side view of the first tubular barrel 132; FIG. 2B illustrates an enlarged end view of the first tubular barrel 132 (of the first end 114); and FIG. 2C illustrates an enlarged view of the portion of the enclosure 110 identified in FIG. 1A, including the first end 114 and the first ferrule 118. The first tubular barrel 132 includes the first end 114 (also the first end of the tubular housing 112) and the first-tubular-barrel second end 136, and an elongated tubular body 115 extending between the first end 114 and the first-tubular-barrel second end 136. The first end 114 includes outer or external threads 144 for threadably attaching to the first end cap 120. In addition, the first tubular barrel 132 may include an annular external groove 141 for receiving an O-ring or other seal 151 (FIG. 1D) for sealing a connection between the first tubular barrel 132 and the first end cap 120.

Figure 3A:
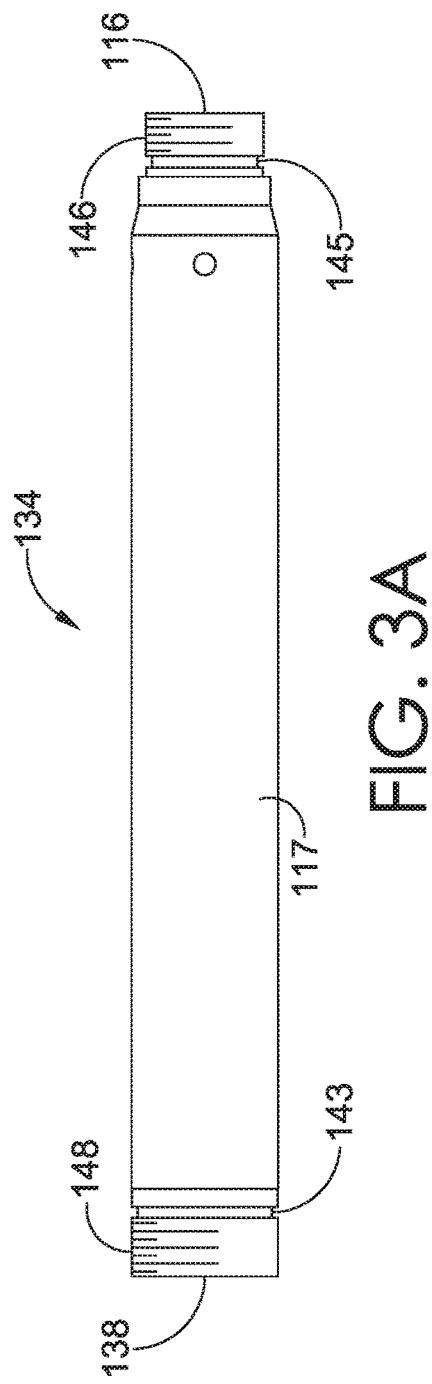
FIG. 3A is an illustration of a second tubular barrel of the fiber-optic-splice enclosure in FIG. 1A, which may telescopically adjust with respect to the first tubular barrel in FIG. 2A, in accordance with an embodiment of the present disclosure.
Figure 3B:
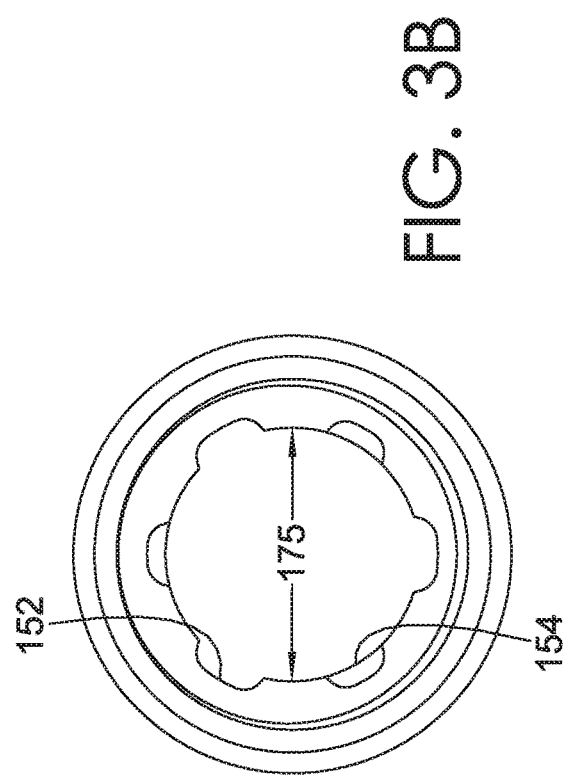
FIG. 3B is an illustration of an end of the second tubular barrel in FIG. 3A (enlarged in FIG. 3B), showing a keyway, in accordance with an embodiment of the present disclosure.

In another aspect, FIGS. 3A and 3B illustrate views of the second tubular barrel 134 (the outer tubular barrel), including FIG. 3A showing a side view and FIG. 3B showing an end view (of the second end 116). The second tubular barrel 134 includes the second-tubular-barrel first end 116 (also the second end 116 of the tubular housing 112) and the second-tubular-barrel second end 138, and an elongated tubular body 117 extending between the second-tubular-barrel first end 116 and the second-tubular-barrel second end 138. The second tubular barrel 134 also includes outer or external threads 146 for threadably attaching to the second end cap 124 and outer or external threads 148 for threadably attaching to the barrel compression cap 142. Furthermore, the second tubular barrel 134 may also include an annular external groove 143 for receiving an O-ring or other seal 153 (FIG. 1C) for sealing a connection between the second tubular barrel 134 and the barrel compression cap 142, as well as another annular external groove 145 for receiving an O-ring or other seal 155 (FIG. 1C) for sealing a connection between the second tubular barrel 134 and the second end cap 124.

Referring to FIG. 1C, FIG. 1C illustrates, among other things, an example of how the first and second tubular barrels 132 and 134 may be adjustably coupled to one another. For example, once the tubular barrels 132 and 134 have been telescopically adjusted to a desired length, the compression ring 140 may be slid along the outer surface of the first tubular barrel 132 to a position abutting the second end 138 of the second tubular barrel 134. Subsequently, the barrel compression cap 142 may be threadably coupled to the outer threads 148 to capture the compression ring 140 against the second end 138 and apply a compressive force against the compression ring 140 to clamp the compression ring 140 against the outer surface of the first tubular barrel 132. Once the compression ring 140 is compressively clamped into position, the compression ring 140 may impede the first and second tubular barrels 132 and 134 from telescopically moving with respect to one another. To release the connection, the barrel compression cap 142 may be unscrewed from the threads 148. When assembled, the elongated tubular bodies 115 and 117 form an elongated tubular body of the tubular housing 112.

In an aspect of the present disclosure, the first tubular barrel 132 may include structures for interacting with, or operating in conjunction with, the first ferrule 118. In addition, or alternatively, the second tubular barrel 134 may include structures for interacting with, or operating in conjunction with, the second ferrule 122. For example, the first end 114 may include a first keyway 146 (e.g., FIG. 2B) and a first set of one or more recesses 148.

The keyway 146 includes one or more grooves 156 (e.g., FIG. 2C) in an internal wall or surface 150, which faces towards the first ferrule 118 when the first ferrule 118 is slid into the first end 114. The grooves 156 extend continuously from the terminus of the first end 114 entirely to an interior space 133 of the first tubular barrel 132. As such, a structure (e.g., of a ferrule) may slide from the first end 114, through the groove 156, and into the interior 133 of the first tubular barrel 132, or alternatively, from the interior 133, through the groove 156, and exit the first end 114. The keyway 146 may include a combination of features making up a profile or shape. For example, the keyway 146 may include grooves or protrusions (e.g., sub-structures), as well as the edges or surfaces that extend between and/or connect the grooves or protrusions. In addition, the features that make up the keyway 146 may each have a particular profile shape to correspond with and/or mate with a corresponding structure on a key. For example, the groove 156 may have a groove profile and the overall keyway 146 may have a keyway profile, including the groove profile and the profile of any other structures making up the keyway. The profile depicted in FIG. 2B is an example, and various other profiles are possible in other aspects of this disclosure.

The recesses 148 may include a shape or profile that is similar to the groove 156 or similar to other sub-structures of the keyway. However, in contrast to the groove 156, the recess 148 includes a stop, base, or wall 149 that interrupts the recess (e.g., between the terminal end of the first end 114 and the interior space 133) and that blocks or impedes a structure (e.g., of a ferrule) from sliding into the interior 133 of the first tubular barrel 132. The wall 149 is also identified in FIGS. 1D and 1s contacting a portion of the ferrule 118.

Referring to FIGS. 3A and 3B, in another aspect, the first end 116 of the second tubular barrel 134 (also the second end 116 of the tubular housing 112) comprises a second keyway 152 and another set of or more recesses 154 similar to the first keyway 146 and recesses 148. The keyways 146 and 152 with constituent sub-structures, as well as the recesses 148 and 154, are an example of one profile, and in other aspects, the enclosure 110, the first tubular barrel 132, and the second tubular barrel 134 may include a variety of alternative profiles and shapes.

Figure 4B:
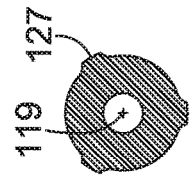
FIG. 4B is an illustration of a cross-sectional view of the ferrule of FIG. 4A, in accordance with an embodiment of the present disclosure.
Figure 4A:
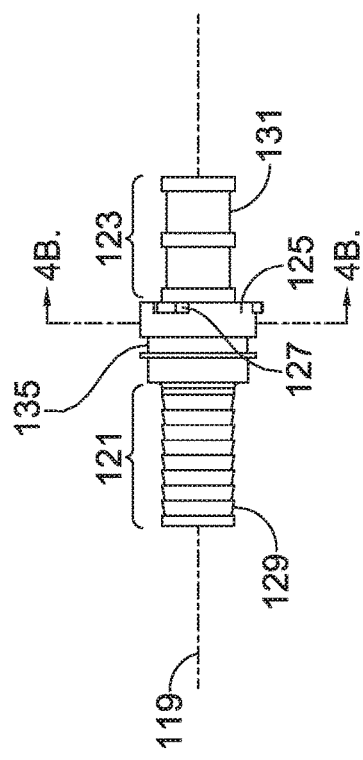
FIG. 4A is an illustration of a ferrule of the fiber-optic-splice enclosure in FIG. 1A, which may couple to an end of a tubular barrel, in accordance with an embodiment of the present disclosure.

Referring now also to FIGS. 4A and 4B, the ferrule 118 is illustrated, and the second ferrule 122 may include the same or similar features as the ferrule 118. The ferrule 118 includes a tubular body, and for explanatory and reference purposes, a reference axis 119 is illustrated in FIGS. 4A and 4B. The ferrule 118 includes a first tubular portion 121 and a second tubular portion 123, and a cable (e.g., 126) may be passed entirely through the first tubular portion 121 and the second tubular portion. For example, a cable (e.g., axially aligned with the ferrule 118) may insert through the first tubular portion 121 and exit from the second tubular portion 123. In one example, when the enclosure 110 is assembled, the first tubular portion 121 is more distally positioned and at least partially outside of, or external to, the first tubular barrel 132, and the second tubular portion 123 is more proximally positioned and at least partially inside the first tubular barrel 132. In addition, the ferrule 118 includes an annular shoulder 125 that is between, or separates, the first tubular portion 121 from the second tubular portion 123.

In a further aspect, the ferrule includes an axial-sectional profile at a cross section transverse to the reference axis 119, and the axial-sectional profile corresponds with at least a portion of the keyway 146 of the first tubular barrel 132. Stated differently, the axial-sectional profile may include a shape or outline that fills negative space of the keyway, or vice versa. An example of an axial-sectional profile is illustrated by the cross-sectional view of FIG. 4B. For example, the annular shoulder 125 includes a protrusion 127 having a profile or shape that corresponds with a shape or profile of the groove 156. In a further aspect, the profile or shape of the protrusion 127 also corresponds with a shape or profile of the recess 148. As such, during assembly or disassembly of the enclosure 110, the axial-sectional profile of the ferrule 118 may be selectively aligned with the keyway to allow the ferrule 118 to pass through the entire length of the first tubular barrel 132, from the first end to the second end. In addition, to retain the ferrule 118 in a position relative to the first tubular barrel 132 (e.g., retained in a position at or against the first end 114), the axial-sectional profile of the ferrule, including the protrusion 127, may be aligned with the recess 148, to nest the protrusion 127 in the recess 148, while the wall 149 impedes the ferrule 118 from axially sliding into the interior space 133. Although the figures illustrate one example in which the tubular barrel(s) 132 and 134 include(s) the one or more grooves 156 and the ferrule(s) includes the protrusion 127, in an alternative embodiment, the surface 150 may include one or more protrusions and the annular shoulder 125 may include one or more grooves and one or more recesses. In yet another aspect, the annular shoulder 125 may include grooves, recesses, protrusions, and any combination therefor.

The ferrule 118 may include other elements as well. For example, the first tubular portion 121 may include one or more annular barbs 129 for inserting into, and engaging with, a tubular wrap (e.g., tubular shrink wrap) for securing the first tubular portion 121 to a cable inserted through the ferrule 118. In addition, the second tubular portion 123 may include one or more annular grooves 131 for securing the second tubular portion 123 to one or more protective sheaths, as will be described in other portions of this disclosure. In a further aspect, the ferrule 118 may include an annular groove 135 for receiving an O-ring or other seal 157 (FIG. 1D) for sealing a connection between the ferrule 118 and the end cap 120.

The ferrule 118 may include various sizes. For example, the ferrule 118 includes an interior space extending continuously through the first tubular portion 121 and through the second tubular portion 123, and the interior space may be sized to fit a fiber-optic cable containing a bundle of a number of fibers. In one aspect, the interior space of the ferrule 118 may be sized to fit a fiber-optic cable containing a bundle of four fibers, and in an alternative aspect, may be sized to fit a larger fiber-optic cable containing a bundle of eight fibers. These are examples, and the ferrule 118 may have a size that is operable with fiber-optic cables of various sizes, including six or fewer fibers or more than six fibers. Furthermore, as stated in other portions of this disclosure, the first ferrule 118 is described with respect to FIGS. 4A and 4B, and the second ferrule 122 may include similar or the same elements.

The enclosure 110 may include other elements as well. For example, the first end cap 120 includes a through hole 158 (1A) and internal threads that threadably couple to the external threads 144 of the first tubular barrel 132. As such, the first tubular portion 121 of the ferrule 118 may be inserted through the through hole 158, and the protrusion 127 may be seated in the recess 148, at which point the first end cap 120 may be threadably coupled to the first end 114 to retain the ferrule 118 in position. Similarly, the second end cap 124 also includes a through hole 160 and internal threads for threadably coupling to the external threads 146 of the second tubular barrel 134 to retain the second ferrule 122 in position.

Figure 5B:
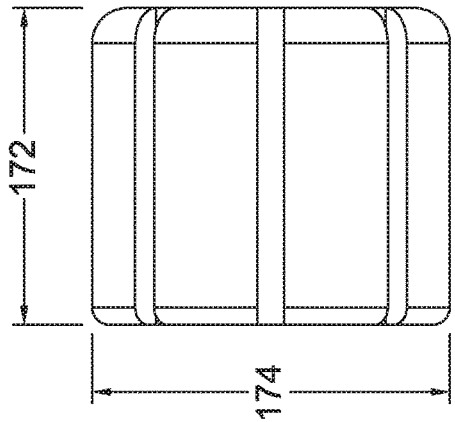
FIG. 5B is an illustration of a side view of the splice retainer of FIG. 5A, in accordance with an embodiment of the present disclosure.
Figure 5A:
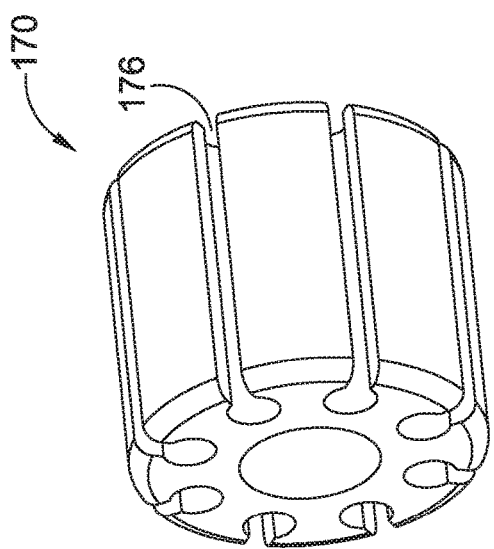
FIG. 5A is an illustration of a perspective view of a splice retainer that may be positioned inside a fiber-optic-splice enclosure, in accordance with an embodiment of the present disclosure.

Referring to FIGS. 1A and 5A and 5B, in a further aspect, the enclosure 110 includes a splice retainer 170 that may be positioned in the interior space of the tubular housing 112. While in FIG. 1A, the splice retainer 170 is illustrated in the interior space of the second tubular barrel 134, the splice retainer 170 may also be positioned in the interior space of the first tubular barrel 132. The splice retainer 170 includes a body, which may have various three dimensional shapes. For example, the splice retainer 170 is illustrated as prismatic and may be a cylinder, or n-polygonal prism (e.g., square prism, octagonal prism, etc.). In one aspect, the body has a length 172 in a first orientation, which generally aligns with an axis of the tubular housing 112. In addition, the splice retainer 170 includes a width 174 between opposing points (e.g., diameter) in a second orientation generally transverse to the first orientation and to the length 172. In an aspect of the present disclosure, the width 174 is smaller than a size of the tubular housing 112, such as the inner diameter of the first tubular barrel 132 and the inner diameter of the second tubular barrel 134, or smaller than dimensions 173 or 175 (e.g., FIGS. 2B and 3B). Furthermore, the splice retainer 170 includes one or more spliced-fiber grippers 176, each of which may frictionally engage a respective spliced fiber. For example, as part of a splicing procedure, a protective tubular sheath may be positioned around a splice of two fibers, and the protective tubular sheath may be frictionally engaged by the spliced-fiber grippers 176. In one aspect, the spliced-fiber grippers 176 comprise radial grooves that extend outward from a center region and that extend continuously along the length of the splice retainer 170. The grooves may have various groove cross sections. For example, in one instance, the grooves may taper in width from a wider portion closer to the center region to a narrower portion closer to the mouth of the groove. In that instance, the tapered, narrower mouth may help to reduce a likelihood that a splice will slip out from, or disengage from, the spliced-fiber gripper.

In a further aspect, the enclosure 110 may include a protective sheath that is securable within the interior space of the tubular housing 112 and around the splice retainer 170. For example, referring to FIG. 1C, a protective sheath 180 is depicted within the interior space of the tubular housing 112. The protective sheath 180 may be secured to the second tubular portions 123 of each ferrule 118 and 122, and extend continuously from one ferrule 118 to the opposing ferrule 122 to protect the spliced region 130. For example, the protective sheath 180 may comprise a tube comprising material that is resistant to heat, chemicals, moisture, or other conditions. An example of one type of material is Kevlar fiber. The tube may include various constructions, such as an extrusion, braided tube, and the like. The tube of the protective sheath 180 may include a first end attachable to the first ferrule 118 (e.g., to the second tubular portion 123 of the first ferrule 118) and a second end attachable to the second ferrule 122 (e.g., to the second tubular portion of the second ferrule 122).

In yet another aspect, the enclosure 110 may include one or more structures for coupling each ferrule to a respective cable. For example, referring to FIG. 1B, the enclosure 110 may include a heat-shrinkable tube 190 and 192 sealingly coupling the first tubular portion 121 of each ferrule to respective cables 126 and 128.

The enclosure 110 may be assembled in various manners. Referring now to FIGS. 6-10, some steps are illustrated for assembling the enclosure 110 in accordance with one aspect of the disclosure. For example, in FIG. 6, a first fiber-optic cable 610 and a second fiber-optic cable 612 are illustrated, and each fiber-optic cable includes a respective cable jacket 614 and 616. It may be desirable to splice the cables 610 and 612 (e.g., one or more corresponding fibers) for various reasons, such as to create a longer cable or to repair a damaged cable. In one aspect of the disclosure, assembly includes sliding at least some components of the enclosure 110 on one of the cables and at least some other components of the enclosure 110 on the other of the cables. For example, the heat shrink tube 192, the second end cap 124, and the protective sheath 180 may be slid, in order, onto the first cable 610; and the heat shrink tube 190, the first end cap 120, and the tubular housing 112 (e.g., first tubular barrel 132, second tubular barrel 134, compression ring 140, and barrel compression cap 142) may be slid in sequential order onto the second fiber-optic cable 612. The heat shrink tube(s) may be selected based on appropriate sizing for the size of cable. In addition, each end cap is positioned so that threads are facing the terminal end of the cable to be spliced. Furthermore, prior to installing on the cable, the proper O-rings or other seals may be seated into respective grooves of the various components (e.g., on ferrules and barrels). Also, the first tubular barrel 132 (e.g., inner barrel) may be slid fully into the second tubular barrel 134 (e.g., outer tubular barrel), such that a length of the tubular housing 112 is minimized.

Figure 6:
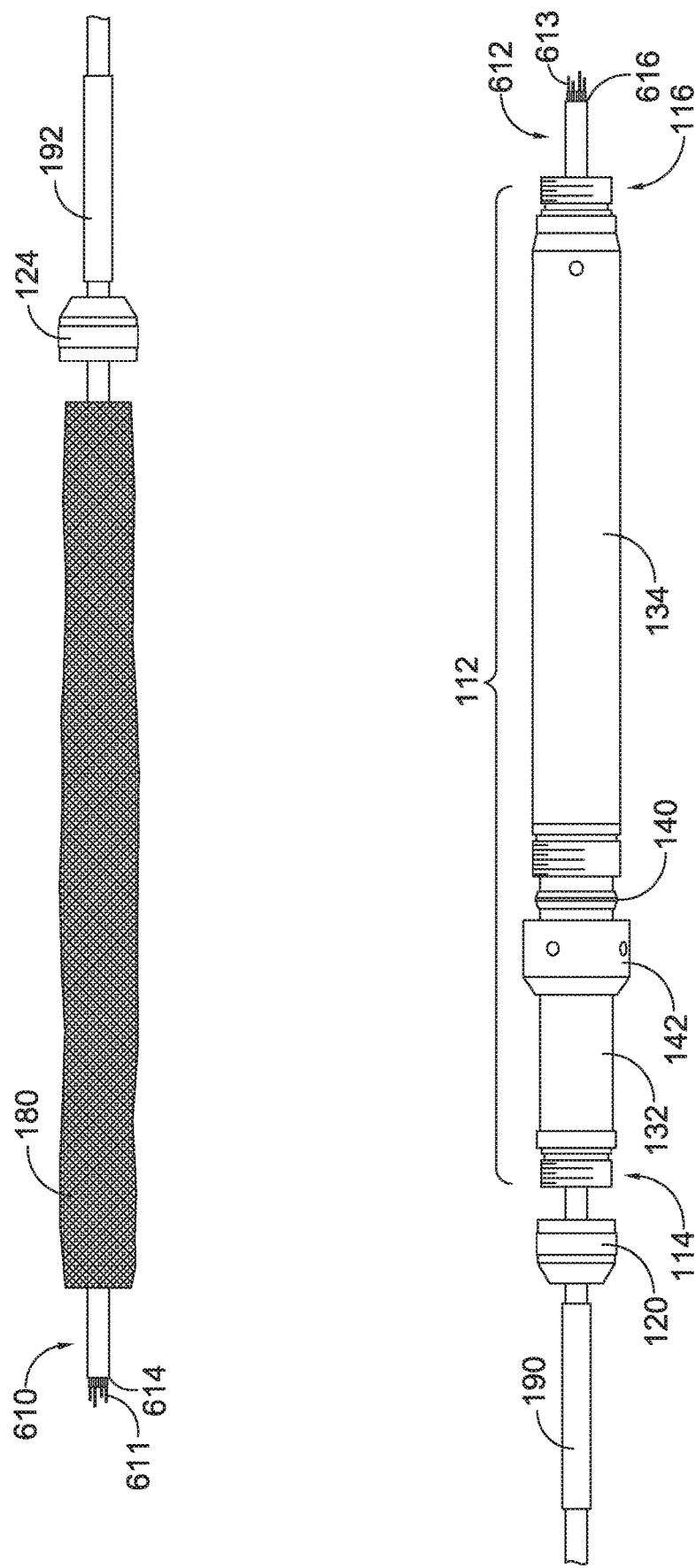
FIG. 6 illustrates a step for assembling a fiber-optic-splice enclosure, the step including arranging a first set of components on a first fiber-optic cable and a second set of components on a second fiber-optic cable, in accordance with an embodiment of the present disclosure.
Figure 7:
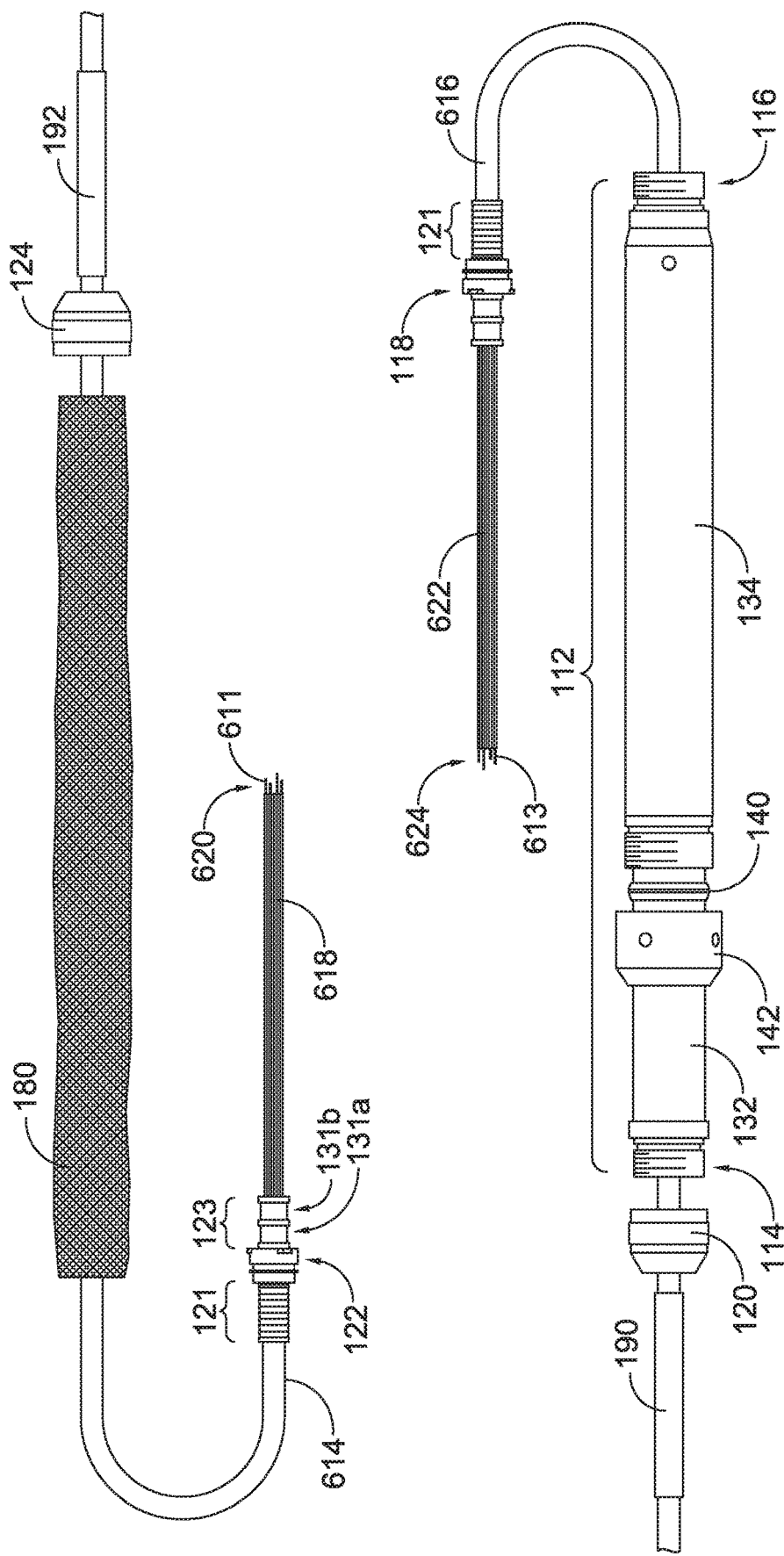
FIG. 7 illustrates another step for assembling the fiber-optic-splice enclosure that may be carried out at some point after the step illustrated in FIG. 6 and that includes stripping a portion of each cable and installing a respective ferrule on each cable, in accordance with an embodiment of the present disclosure.

Referring to FIG. 7, in a subsequent stage of the assembly (some point after completing the setup in FIG. 6), the jacket 614 of the first cable 610 is stripped down by a length (e.g., about 8 inches to about 10 inches) and the sheath (not depicted) of each individual fiber is also stripped down to the jacket. Then, exposed portions of the cable, such as the protective encasement 618 and the fibers 620, are inserted through the second ferrule 122. The first tubular portion 121 of the second ferrule 122 is slid onto the outer surface of the jacket 614. Similar steps are carried out for the second cable 612, and the jacket 616 is stripped, and the exposed portions of the cable, such as the protective encasement 622 and the fibers 624, are inserted through the first ferrule 118. The first tubular portion 121 of the first ferrule 118 is slid onto the outer surface of the jacket 616.

Figure 8:
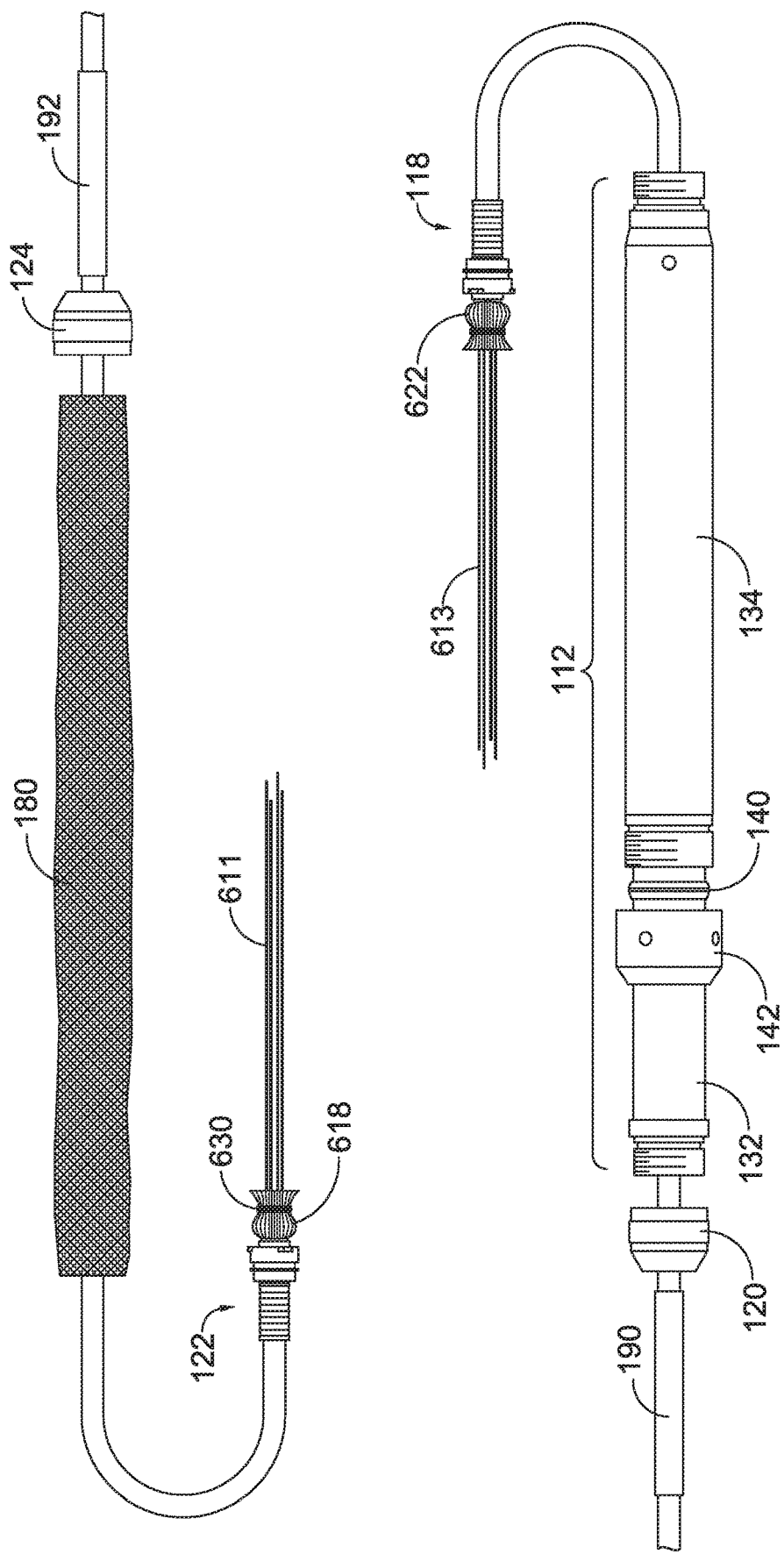
FIG. 8 illustrates another step for assembling the fiber-optic-splice enclosure that may be carried out at some point after the step illustrated in FIG. 7 and that includes coupling a portion of each cable to a respective ferrule, in accordance with an embodiment of the present disclosure.

Referring to FIG. 8, in a subsequent stage of the assembly (at some point after completing the setup in FIG. 7), each of the protective encasements 618 and 622 is secured to a respective ferrule. For example, the encasement may be folded rearwardly (e.g., folded towards the ferrule) and over the second portion 123 of the ferrule, including over the annular grooves 131a and 131b (see e.g., FIG. 7 for reference to second portion 123 and annular grooves 131a and 131b). A coupler (see e.g., 631 in FIG. 1D) may be attached around the rearwardly folded encasement and secured in the first groove 131a. For example, tape or a wire tie or other zip tie mechanism may be wrapped around the folded encasement and compressively tied or secured in the first groove 131a. Then, the encasement may be folded forwardly (e.g., towards the terminal ends of the fibers and covering the coupler in the first groove 131a), and a second coupler 630 (e.g., tape or wire tie or other zip tie mechanism) may be wrapped around the forwardly folded encasement 618 and secured in the second groove 131b. Once the second coupler 630 has been installed, excess length of the encasement may be cut. This process is completed for both cables.

Figure 9:
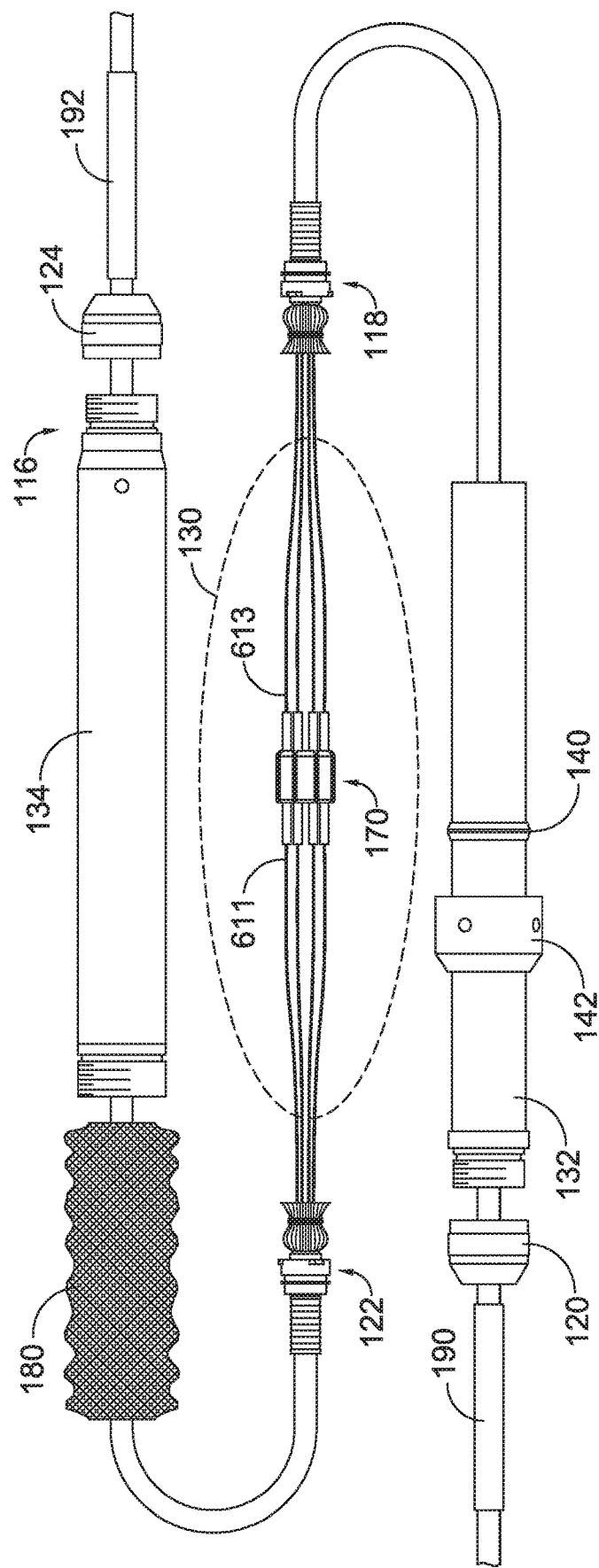
FIG. 9 illustrates another step for assembling the fiber-optic-splice enclosure that may be carried out at some point after the step illustrated in FIG. 8 and after the fibers have been spliced and that includes sliding one of the tubular barrels to the opposing side of the spliced region and installing a splice retainer, in accordance with an embodiment of the present disclosure.
Figure 10:
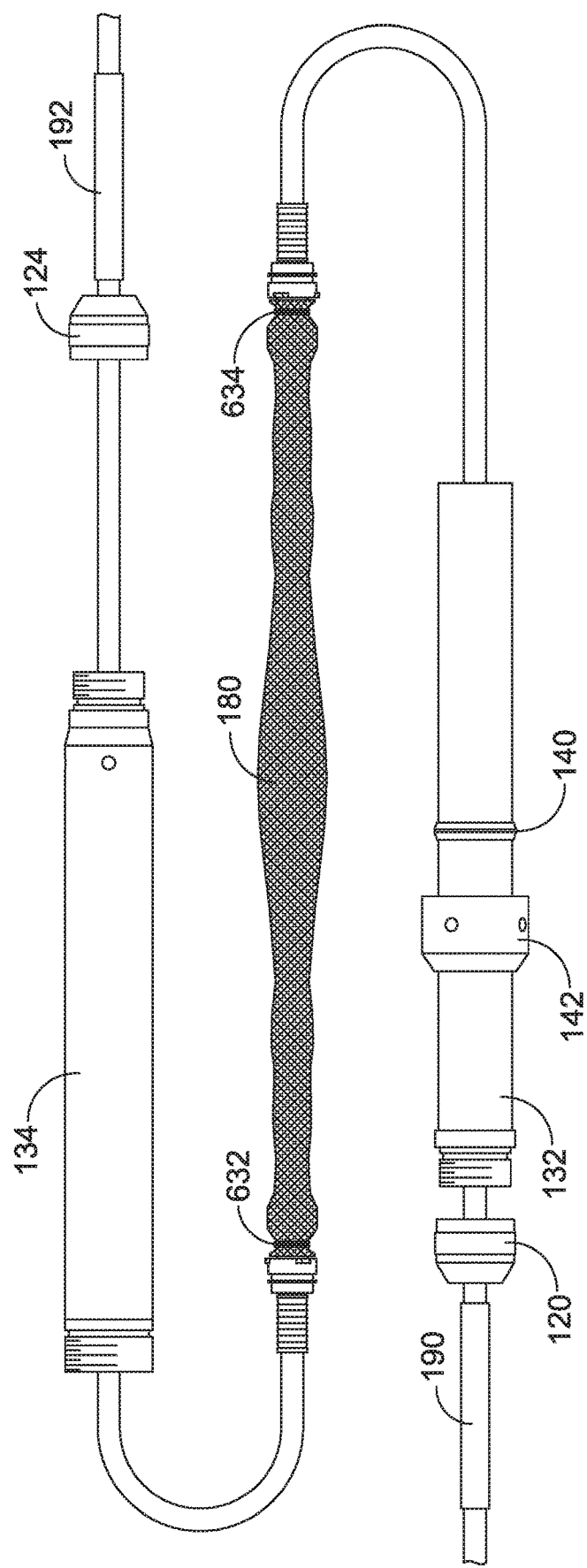
FIG. 10 illustrates another step for assembling the fiber-optic-splice enclosure that may be carried out at some point after the step illustrated in FIG. 9 and that includes sliding a protective sheath into position around the spliced region and affixing the protective sheath to each ferrule, in accordance with an embodiment of the present disclosure.

Referring to FIGS. 9 and 10, in subsequent stages of the assembly (after completing the setup in FIG. 8), the corresponding fibers of each cable are spliced (e.g., using a fusion splicing apparatus). After splicing, the second tubular barrel 134 may be decoupled from the first tubular barrel 132 and moved to an opposite side of the spliced region 130. For example, the keyway 152 of the second end 116 of the second tubular barrel 134 is aligned with the key (e.g., protrusion) of each ferrule to allow each ferrule and the second tubular barrel 134 to slide unimpededly past one another. The second tubular barrel 134 may also be slid past the protective sheath 180 to a position shown in FIG. 9.

After the barrels 132 and 134 have been separated, each spliced fiber may be secured in a groove of the splice retainer 170. Then, the protective sheath 180 is slid from the first cable 610 and over the spliced region 130, and opposing ends of the protective sheath 180 are secured to the ferrules using couplers 632 and 634 (e.g., tape, wire, or zip ties).

After the protective sheath 180 is secured over the spliced region 130, the barrels 132 and 134 may be assembled, as shown in FIGS. 1B and 1C. For example, each barrel 132 may be slid to a position encasing the protective sheath 180 and between the ferrules 118 and 122. In other words, both ferrules 118 and 122 may be outside the tubular housing 112 at each end. At that point, the ferrules 118 and 122 are gently pulled apart and make sure that the fiber inside the enclosure is substantially straight (e.g., limited bending or twisting fiber). Then, the barrels 132 and 134 are expanded until each reaches a respective ferrule. Each ferrule may then be rotated to align the respective key of each ferrule with the recess(es) in a respective end of the tubular barrel 112. Once the ferrule is seated in the recesses of the barrel, the end caps may be threadably coupled to the barrel to retain the ferrule in position.

After the end caps have been coupled to the barrels, to reduce the likelihood of bends in the fiber, the housing 112 may be expanded by gently pulling the barrels 132 and 134 outward until the fiber inside is almost straight (e.g., the barrels may be expanded until a small amount of tension is felt). Once the housing 112 is expanded, the barrels may be secured in position using the compression cap 142 and the compression ring 140. Finally, each heat shrink tube may be slid over the exposed second tubular portion of each ferrule and heat may be applied to secure the connection.

Figure 11:
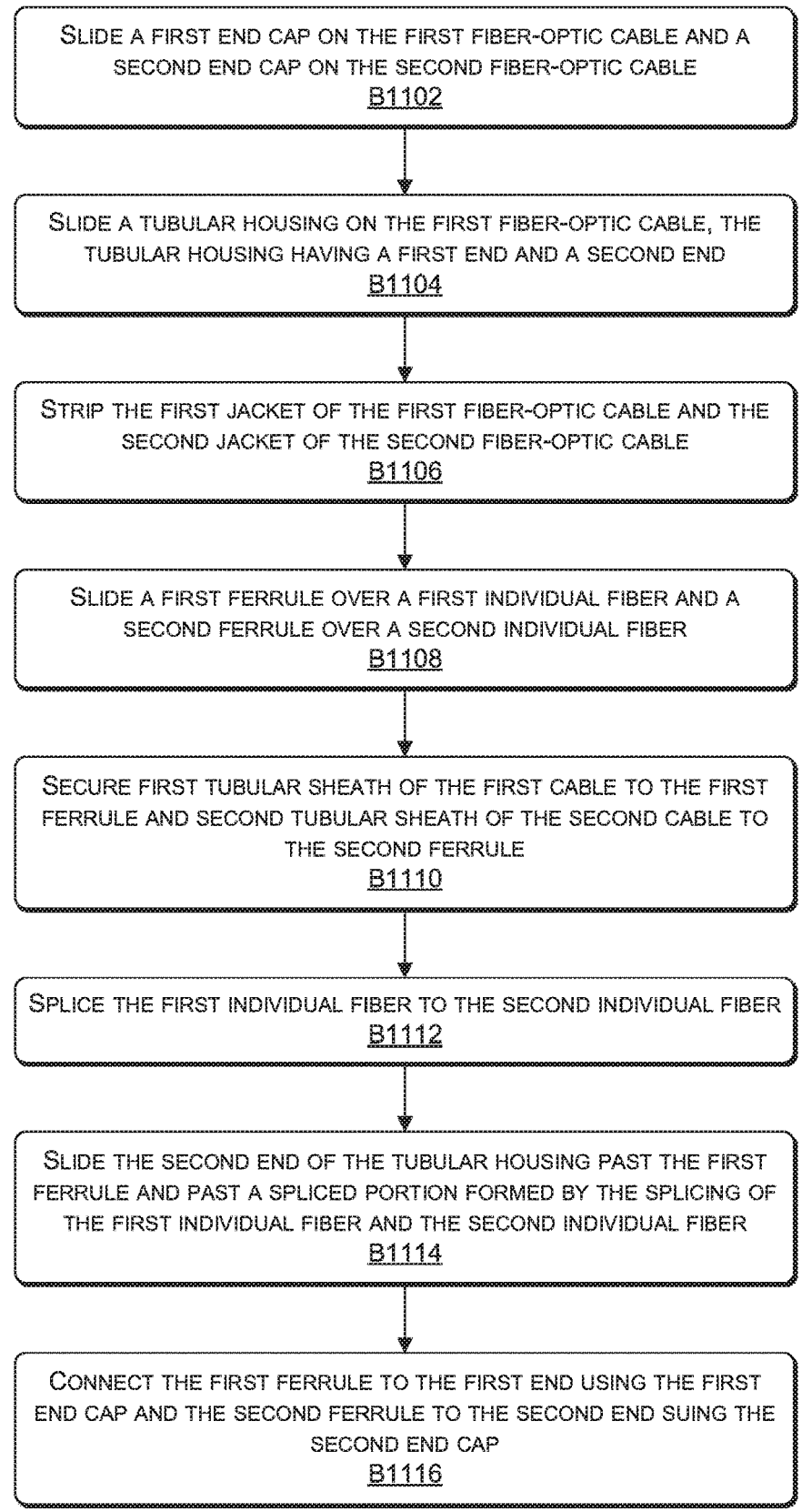
FIG. 11 illustrates a flow chart with steps that might be performed as part of a method of splicing a first fiber-optic cable to a second fiber-optic cable, in accordance with an embodiment of the present disclosure.

Now referring to FIG. 11, each block of method 1100, described herein, comprises a step that may be carried out by an operator of splicing a first fiber-optic cable to a second fiber-optic cable. Method 1100 is described, by way of example, with respect to the fiber-optic-splice enclosure 110 illustrated in FIGS. 1-10. However, this method may additionally or alternatively be executed using other enclosures equivalent to the fiber-optic-splice enclosure 110.

FIG. 11 is a flow diagram showing a method 1100 for splicing a first fiber-optic cable to a second fiber-optic cable, in accordance with an aspect of the present disclosure. The first fiber-optic cable includes a first individual fiber that is enclosed by a first tubular sheath, which is enclosed by a first tubular jacket. The second fiber-optic cable includes a second individual fiber that is enclosed by a second tubular sheath, which is further enclosed by a second tubular jacket. An example of a first fiber-optic cable is identified by reference number 612 in FIG. 6, including a first individual fiber 613 (FIG. 8) enclosed by a first tubular sheath 622, which is enclosed by a first tubular jacket 616. In addition, the fiber-optic cable 610 is an example of a second fiber-optic cable, including a second individual fiber 611 (FIG. 8) enclosed by a second tubular sheath 618, which is enclosed by a second tubular jacket 614.

The method 1100 includes at block B1102, sliding a first end cap on the first fiber-optic cable and a second end cap on the second fiber-optic cable. For example, as illustrated in FIG. 6, the first end cap 120 is slid on the first fiber-optic cable 612, and the second end cap 124 is slid on the second fiber-optic cable 610.

The method includes at block B1104, sliding a tubular housing on the first fiber-optic cable, the tubular housing having a first end and a second end. For example, as illustrated in FIG. 6, the tubular housing 112 is slid on the first fiber-optic cable 612, and as illustrated in FIG. 1, the tubular housing 112 includes the first end 114 and the second end 114.

The method includes at block B1106, striping the first jacket of the first fiber-optic cable and the second jacket of the second fiber-optic cable. For example, as illustrated in FIG. 7, the first jacket 616 and the second jacket 614 have been stripped a distance (e.g., between about 8 inches and about 10 inches).

The method includes at block B1108, sliding a first ferrule over the first individual fiber and a second ferrule over the second individual fiber. In an aspect, the first ferrule and the tubular housing are both positioned on the first fiber-optic cable. In addition, as relatively positioned along the first fiber-optic cable, the second end of the tubular housing is between the first ferrule and the first end of the tubular housing. For example, as illustrated in FIG. 7, the first ferrule 118 is slid over the first individual fiber 613 and the second ferrule is slid over the second individual fiber 611. In addition, the first ferrule 118 and the tubular housing 112 are both positioned on the first fiber-optic cable 612. Furthermore, as relatively positioned along the first fiber-optic cable 612, the second end 116 of the tubular housing 112 is between the first ferrule 118 and the first end 114 of the tubular housing 112.

The method includes at block B1110, securing the first tubular sheath to the first ferrule and the second tubular sheath to the second ferrule. For example, as illustrated in FIG. 8, the first tubular sheath 622 is secured to the first ferrule 118, and the second tubular sheath 618 is secured to the second ferrule 122.

The method includes at block B1112, splicing the first individual fiber to the second individual fiber. For example, as illustrated in FIG. 9, the first individual fiber 613 has been spliced (e.g., fusion spliced) to the second individual fiber 611.

The method includes at block B1114, sliding the second end of the tubular housing past the first ferrule and past a spliced portion formed by the splicing of the first individual fiber and the second individual fiber. For example, as illustrated in FIG. 9, the second end 116 has been slid from the position in FIG. 8, past the first ferrule 118 and past the spliced portion 130.

The method includes at block B1116, connecting the first ferrule to the first end using the first end cap and the second ferrule to the second end suing the second end cap. For example, as illustrated in FIGS. 1A, 1B, and 1C, the first ferrule 118 is connected to the first end 114 using the first end cap 120, and the second ferrule 122 is connected to the second end 116 using the second end cap 124. In one aspect, prior to securing the first ferrule 118 to the first end 114 and the second ferrule 122 to the second end 116, the method may also include securing the protective sheath 118 in position, straightening the spliced portion 130 and expanding the tubular housing, as described in other aspects of this disclosure.

Having described various aspects related to the figures mentioned above, a few other aspects will now be described. One aspect of the present disclosure includes an enclosure (e.g., 110) for a fiber-optic splice. The enclosure may include a tubular housing (e.g., 112) having a first end (e.g., 114) with a keyway (e.g., 146) and a second end (e.g., 116). In addition, the enclosure may include a first ferrule (e.g., 118) that includes an axial-sectional profile (e.g., FIG. 4B) corresponding with the keyway and that attaches to the first end. Further, the enclosure may include a second ferrule (e.g., 122) that attaches to the second end.

In another aspect, the present disclosure includes an enclosure (e.g., 110) for a fiber-optic splice. For example, the enclosure may include a tubular housing (e.g., 112) having an inner diameter, a first end (e.g., 114), and a second end (e.g., 116). In addition, the enclosure may include a first ferrule (e.g., 118) that attaches to the first end and a second ferrule (e.g., 122) that attaches to the second end (e.g., 116). Furthermore, the enclosure may also include a splice retainer (e.g., 170) positionable in a space (e.g., FIG. 1A) at least partially enclosed by the tubular housing. The splice retainer may include a body having a width (e.g., 174) less than the inner diameter and a plurality of radial grooves (e.g., gripper 176) to receive a plurality of spliced fiber portions.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

From the foregoing, it will be seen that this disclosed subject matter is well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

What is claimed is:

1. An enclosure for a fiber-optic splice, the enclosure comprising:
   a tubular housing having a first end with a keyway and a second end;
   a first ferrule that includes an axial-sectional profile corresponding with the keyway and that attaches to the first end, wherein the axial-sectional profile is at an annular shoulder along a length of the first ferrule, wherein the first ferrule includes a distal tubular portion that is on one side of the annular shoulder and that is positioned outside of the tubular housing when the first ferrule is attached to the first end, and wherein the first ferrule includes a proximal tubular portion on an opposing side of the annular shoulder as the distal tubular portion and housed inside the tubular housing when the first ferrule is attached to the first end; and
   a second ferrule that attaches to the second end.

2. The enclosure of claim 1, wherein the first end includes a groove along a ferrule-facing surface, the groove having a groove profile; wherein the first ferrule includes a protrusion having a protrusion profile corresponding with the groove profile; and wherein the first ferrule is unimpeded by the tubular housing from axially sliding relative to the first end when the protrusion is aligned with the groove.

3. The enclosure of claim 1, wherein the first end includes a recess having a recess profile and the first ferrule includes a protrusion having a protrusion profile corresponding with the recess profile, and wherein the first ferrule is impeded by the tubular housing from axially sliding relative to the first end in at least one direction when the protrusion is nested in the recess.

4. The enclosure of claim 1, wherein the second end includes a second keyway, and wherein the second ferrule includes a second cross-sectional profile corresponding with the second keyway.

5. The enclosure of claim 1 further comprising, a cable retainer positionable inside the tubular housing, the cable retainer comprising a plurality of radial grooves, each of which is to receive a spliced fiber portion.

6. The enclosure of claim 1, wherein the proximal tubular portion includes at least one annular groove on an exterior surface of the proximal tubular portion.

7. The enclosure of claim 1, wherein the distal tubular portion includes one or more barbs insertable in a heat-shrinkable tube.

8. The enclosure of claim 1, wherein the tubular housing is an adjustable-length tubular housing comprising a first tube comprising the first end and a second tube comprising the second end, the second tube telescopically adjusting relative to the first tube.

9. An enclosure for a fiber-optic splice, the enclosure comprising:
   a tubular housing having an inner diameter, a first end, and a second end;
   a first ferrule that attaches to the first end;
   a second ferrule that attaches to the second end; and
   a cable retainer positionable in a space at least partially enclosed by the tubular housing, the cable retainer comprising a body having a width less than the inner diameter, and wherein the cable retainer comprises a plurality of radial grooves to receive a plurality of spliced fiber portions,
   wherein the first ferrule includes a first-ferrule tubular portion with a first annular groove, a first sheath end being attachable in the first annular groove; and
   wherein the second ferrule includes a second-ferrule tubular portion with a second annular groove, a second sheath end being attachable in the second annular groove.

10. The enclosure of claim 9 further comprising, a protective sheath having the first sheath end attachable to the first ferrule and the second sheath end attachable to the second ferrule.

11. The enclosure of claim 10, wherein the cable retainer is positioned inside the protective sheath and the protective sheath is positioned between the cable retainer and the tubular housing.

12. The enclosure of claim 9, wherein the first end comprises a keyway and the first ferrule comprises an axial-sectional profile corresponding with the keyway.

13. The enclosure of claim 9, wherein the tubular housing is an adjustable-length tubular housing comprising a first tube comprising the first end and a second tube comprising the second end, the second tube telescopically adjusting relative to the first tube.

* * * * *